May 24, 1949.  G. R. DUNCAN  2,470,979
MEANS FOR MILKING DOMESTIC FARM ANIMALS AND FOR
TEMPORARILY STORING MILK AND COOLING IT
Filed June 13, 1946  4 Sheets-Sheet 1
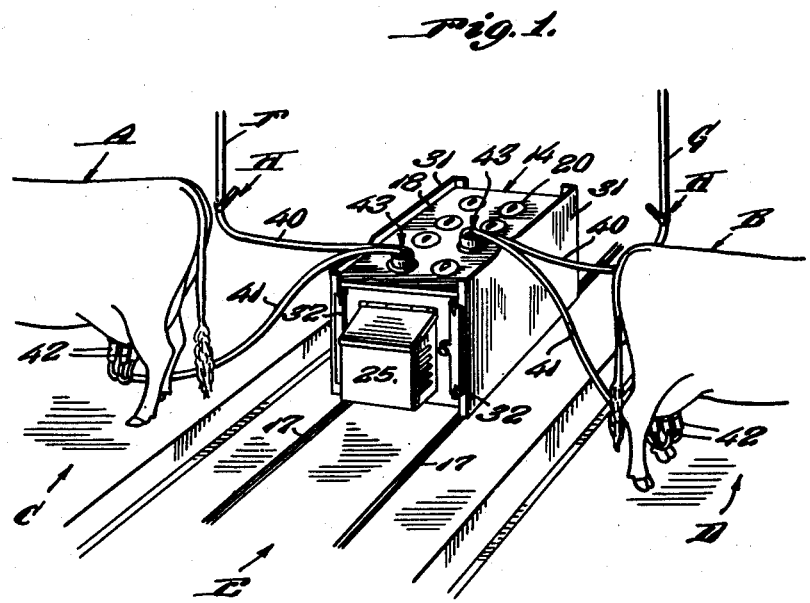
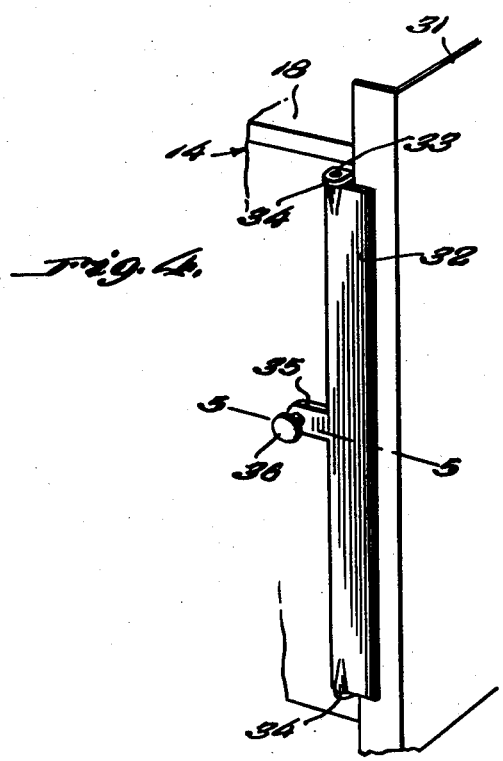
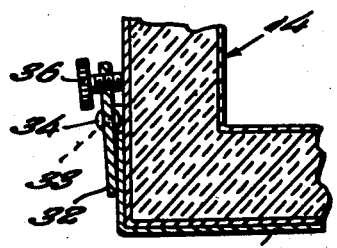
Inventor
George R. Duncan
By Clarence A. O'Brien
and Harvey B. Jackson
Attorneys

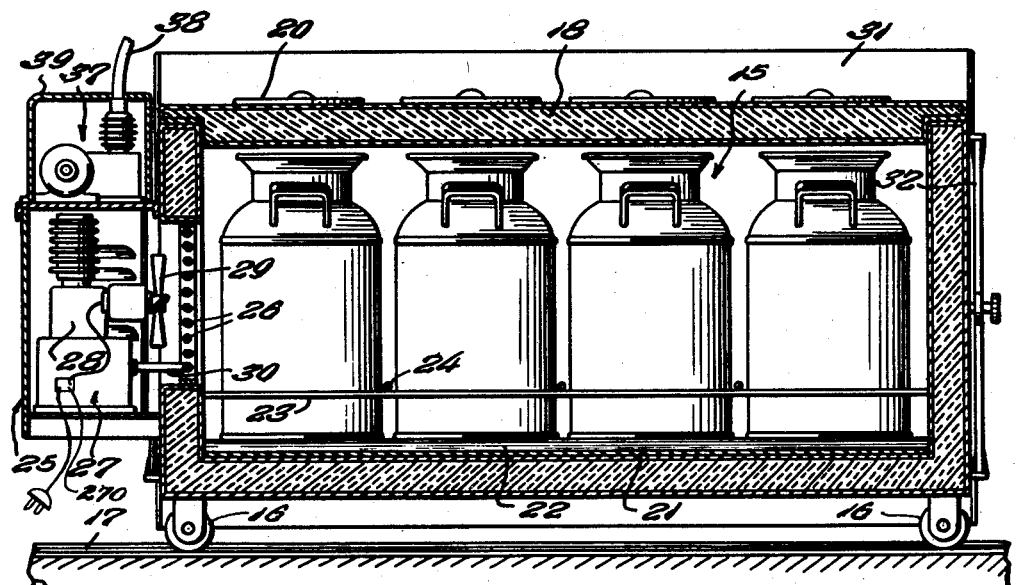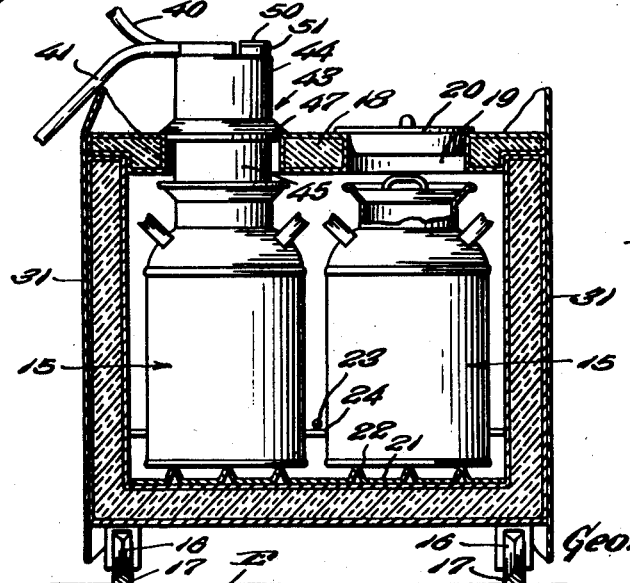

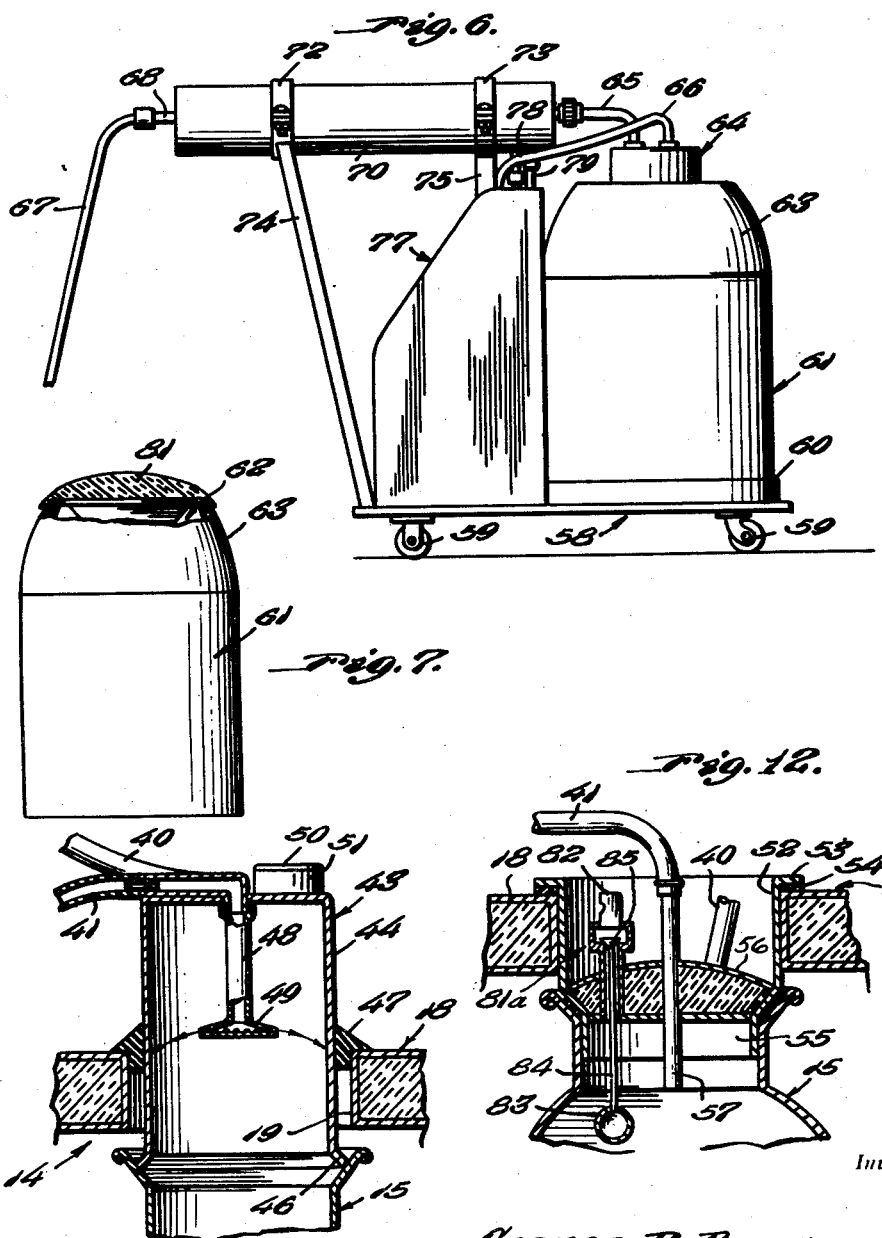

May 24, 1949.   G. R. DUNCAN   2,470,979
MEANS FOR MILKING DOMESTIC FARM ANIMALS AND FOR
TEMPORARILY STORING MILK AND COOLING IT
Filed June 13, 1946   4 Sheets-Sheet 4
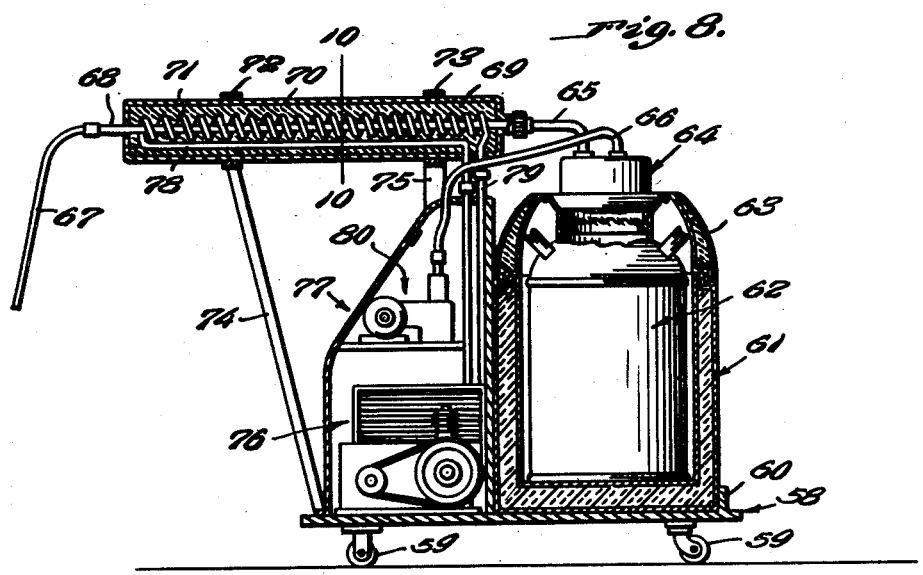
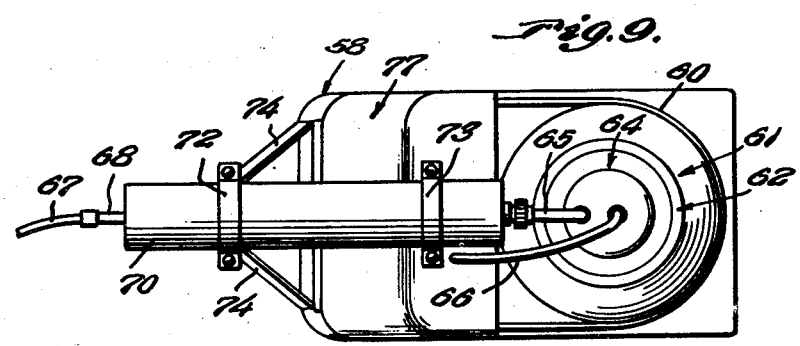
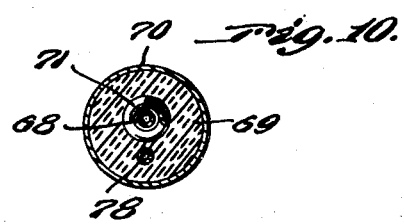

Patented May 24, 1949

2,470,979

UNITED STATES PATENT OFFICE 2,470,979

MEANS FOR MILKING DOMESTIC FARM ANIMALS AND FOR TEMPORARILY STORING MILK AND COOLING IT

George R. Duncan, Washington, Mo.

Application June 13, 1946, Serial No. 676,368

11 Claims. (Cl. 31—58)

The present invention relates to a method and means to handle the steps of milking and collecting and cooling of milk in an economical and expeditious manner.

More specifically the underlying principle of the invention is to refrigerate milk direct from a cow's udder and to accomplish such results, through the medium of a highly practicable and satisfactory assemblage of components, devices, and parts.

In carrying out the principles of the invention I contemplate milking the cows in their stalls in a conventional barn, this through the medium of a portable conveyance, said conveyance being moved progressively along the runway between opposed stalls, said conveyance being provided with one or more milk cans or equivalent containers and a pulsator or milking machine being hooked up at one end to the udder of the cow and communicating and being hooked up at the opposite end to means to deliver the milk into cans or equivalent receptacles.

Stated with greater particularity, and in keeping with my ideas, I provide a support, preferably a mobile conveyance, cooling means on the support, a milk receiving and temporary storing container or can on said support and automatic suction controlled milking means attachable at one end to the cow's udder and arranged and communicating at its opposite end with said container, whereby to take the milk direct from the cow and to deliver it into said container cooled and ready for handling.

Modern dairy barns are provided with valved depending accommodation pipes for milking machines and therefore one phase of the invention has to do with the provision of a special head which is applicable to the milking machine, said head being fashioned to fit in the neck of a regulation milk can and the milk can being contained in the refrigerated compartment in a refrigerator, the refrigerator being on or a part of a truck.

Alternate forms of refrigerated or cooled can supporting conveyances are utilized and suitable appliances provided for making a connection between the milking machine and intake neck of the milk can and these objects and advantages will be set forth as the descriptive specifications proceed.

Other objects, features and advantages of the invention will become more readily apparent from the following description of the accompanying illustrative drawings.

In the drawings, wherein like numerals are employed to designate like parts throughout the views:

Figure 1 is a perspective view showing the fragmentary portion of a dairy barn, showing pulsator type milking machines in use, and showing same operatively connected up with the multiple can containing refrigerator cabinet;

Figure 2 is a longitudinal sectional and elevational view through the preferred refrigerator cabinet showing a multiplicity of milk cans therein and also showing the compressor and fan, and a suction pump such as may be utilized on the refrigerator as a part of the milking machine;

Figure 3 is a transverse vertical sectional and elevational view through the assemblage seen in Figure 2 this to bring out the provision and arrangement of one of the delivery heads connected up with a milk can;

Figure 4 is a fragmentary perspective view showing retaining means for a removable shield such as is used for sanitary purposes on exposed side walls of the refrigerator cabinet;

Figure 5 is a section on the line 5—5 of Figure 4;

Figure 6 is an elevational view of a different type of conveyance, this for single cans, the same embodying modified means for pre-cooling the milk before it enters the can;

Figure 7 is a view in section and elevation showing the insulated can container removed from the truck or conveyance and showing a closing lid thereon;

Figure 8 is a view in section and elevation taken vertically and centrally through the structure seen in Figure 6;

Figure 9 is a top plan view of the structure illustrated in Figure 6;

Figure 10 is a cross section, enlarged, on the line 10—10 of Figure 8;

Figure 11 is an enlarged sectional view through the feeder and delivery head used at the left in Figure 3;

Figure 12 is a modified structure for delivering and feeding milk into a milk can, the latter in the refrigerator cabinet.

Reference is had first to Figure 1 of the drawings showing a fragmentary portion of a dairy barn. To bring out the basic ideas and principles of the invention I have shown fragmentary representations of cows A and B, the stalls C and D, the gutter equipped runway E and depending milking machine accommodation pipes F and G. These pipes F and G are provided with valved devices, of any suitable type, H for purposes of accommodating pulsator type milking machines. The pipes F and G depend from other ceiling pipes (not shown) for the purposes of supplying the necessary suction for operating the milking machine. I might point out here that it is within the range of the invention to use existing suction equipment in the barn or to so construct the refrigerator conveyance as to include the source of suction directly thereon. In the broad arrangement seen in Figure 1 the refrigerator cabinet or conveyance is denoted by the numeral 14 and is adapted to house a plurality of milk cans 15 as shown in Figure 2. With reference to Figure 2 the conveyance is a refrigerator cabinet properly constructed and insulated, the same being of appropriate dimensions in form and including wheels 16 to travel on rails or tracks 17 provided in the aforementioned runway E. The removable top or cover 18 is provided with openings 19, these to accommodate lids 20 arranged over the intake necks of the milk cans. The entire cover and lids come off, as a unit, to permit the cans to be inserted and removed. On the interior of the cabinet, as shown in Figure 3, I provide a suitable liner or floor 21 with upstanding ribs 22 to support the cans in elevated position. I also provide longitudinal wire rods 23 and cross-rods 24 to provide a rack to assist in holding the cans in proper positions and alined with the openings 19. As shown in Figure 2 the numeral 25, generally speaking, denotes an evaporator for the cooling chamber or compartment of the refrigerator. This is lined up with a cooling coil 26 built into an opening provided therefor and said structure also includes a compressor 27, motor 28, and fan 29. A circulator pipe 30 serves to feed the cooling coil 26. The fan is arranged to blow air currents against the coil and into the compartment of the refrigerator. The automatic control of the refrigerating mechanism may be of any conventional type and may include, for instance, a pressure controlled switch 27a that will shut off current to the motor when the pressure in the high side of the compressor is reduced below a predetermined amount and, similarly, will operate to connect the motor as the pressure increases to this amount or rises above it. This invention is not concerned with any specific type of control.

The numerals 31 designate paper or equivalent removable shields used as anti-splash guards on those sides or faces of the refrigerator facing the stalls. The ends are folded or bent and held in place by clamping strips 32 (see Figure 4) these being hingedly mounted at 33 on ears 34. The clamping strips are provided with lugs 35 to accomplish or attain the desired clamping action (see Figure 5).

In the form of the invention so far described we have a conveyance truck in the form of a refrigerated milk can or cabinet. This may be of the type seen in Figure 1 wherein the aerator or refrigeration unit is built on one end of the cabinet. Or, I may provide on the same end a suction pump 37 with a suction line 38 and a shield 39 adapted to be connected to the accommodation pipes F and G, or to be substituted therefor. This arrangement is employed when it is desired to include the suction means as an attending part of the conveyance. In Figure 1 the suction is obtained by way of the valved pipe lines F and G. Therefore this arrangement of the hose 40 in Figure 1 is shown connected up with the valve device H. The other hose 41 is provided with teat cups 42 connected with the teats on the cow's udder. The hose lines 40 and 41 connect with an accommodation distributor, delivery and feeder head 43 as shown in Figure 3. This head may be of variable form. In the arrangement seen in Figure 3 it is in the form of an inverted cup-like shell 44 to which the pipe lines 40 and 41 connect as shown in Figure 1. The lower end of the shell as at 45 is flanged and fits into the neck of the milk can as at 46 in Figure 11. A gasket is provided at 47 to supply the desired pipe jointed connection between the head 43 and the top of the refrigerator-cabinet. As seen in Figure 11 the head includes a distributing tube 48 and a spray head 49 to facilitate the operation of showering the milk down into the can. The numeral 50 designates a sight window mounted on a collar 51 these features serving to permit the attendant to inspect the operation and to determine the results from time to time. If desired the entire head 43 can be transparent to permit one to readily determine when the can is properly filled.

As is obvious, the suction is created within the confines of the head 43, using the suction line 40 for that purpose. Thus, the desired suction is provided in the line 41 and the milk is drawn in and deposited in the head and then in the can.

In the modification seen in Figure 12 a different type of adaptor head is provided. This comprises a sleeve 52 fitting into the opening in the cabinet cover and having a flange 53 with a packing ring 54. The sleeve is provided with a reduced end 55 fitting into the neck of the can and also an intermediate annulus serving as a seat for the insulated can closing plug 56. This serves to accommodate a pipe fitting 57 to which the hose 41 is connected. The remaining hose 40 is also connected to the closure 56. This is just a variation in ways and means of hooking up the hose lines of the milking machine with the refrigerator can containing cabinet.

Coming now to the modified and simplified construction seen in Figures 6, 7, 8, 9 and 10 it will be seen that the truck or conveyance comprises a platform 58 with rollers or wheels 59 and an upstanding accommodation flange 60 for an insulated receptacle or container 61. This serves to accommodate the milk can 62. Also it has a removable fitting or collar 63 surrounding the intake neck of the can. Any suitable type of adaptor head 64 is provided to accommodate the milk line or hose 65 and suction line or hose 66.

In the form of the invention under consideration the milk from the udder of a cow is taken in by way of the hose line 67 where it enters a pipe 68 mounted in insulation 69 in a horizontal cylindrical unit 70. This cooling unit includes a coil 71 through and beyond which the pipe 68 extends where it connects up with the aforementioned milk delivery line or hose 65. I provide clamps 72 and 73 which surround the cylinder 70 and are held in place by braces 74 and 75. The refrigerant circulator and compressor unit is indicated at 76 and is mounted in a housing 77 on the platform, the same being provided with supply and return pipes 78 and 79 connected up with the aforementioned cooling coil. The numerals 80 designate an appropriate suction pump which creates suction in the aforementioned suction line 66.

If desired the container 61 may be removed from the platform as shown in Figure 7 at which time an appropriate closing lid 81 is employed as a cover for the neck of the milk can. The entire collar 63 can be lifted off of the main or body portion of the insulated container 61 to permit the milk can to be easily inserted and removed.

The following are some of the outstanding aspects of the constructions herein shown and described, to wit:

A. The milk is refrigerated direct from the cow's udder in the first container. Milk from udder is conveyed to can in refrigerator cabinet with any suitable piping hose suitable for milk. A milking machine is used to draw the milk from the cow's udder to the refrigerator and into the can. A milking machine vacuum pump is installed on the milk refrigerator. The milking machine is made to work in connection with milk refrigerator to cause the milk to be refrigerated. The milking machine can be mounted on the refrigerator cabinet, conveying the milk to can through a small pipe into can. A part, or all parts, necessary to successfully run the milking machine, are connected to cabinet, at any suitable place on cabinet.

B. A portable milk refrigerator comprising a compressor or equivalent means to refrigerate the milk as it runs into a can while latter is inside the cabinet, or a suitable alternative arrangement which functions to maintain the cans at a certain temperature where, for example, the milk is refrigerated by the way of delivery pipes before said milk enters the can. Mechanical refrigerating equipment of the present type, provided with means for controlling the refrigerating and cooling means, is shown by the patent to Smith, No. 1,913,345, granted June 6, 1933 (page 2, lines 16 to 22), and the patent to Keyser, No. 2,285,520, granted June 9, 1942 (page 3, paragraph 1, lines 15 to 20).

It is understood that in Figure 1 I show only the refrigerated cabinet, the suction pump in this arrangement being omitted and the suction being obtained by way of the already existing lines F and G in the dairy barn. In other words here all that is necessary is to provide a special head 43 on the hose line 41 of a milking machine and to thus employ installations already in use.

In the arrangement seen in Figure 2 the suction pump 37 is provided on the refrigerator or cabinet permitting the milking machine to be made a part of the cabinet. It follows that the invention is intended to comprehend the arrangement seen in Figure 1 regardless of the source of suction or the arrangement seen in Figure 2 wherein the suction pump is built on the refrigerator or cabinet.

The invention also covers the modification of Figures 6, 8 and 9 wherein the milk is cooled before it goes into the can. It follows that the cooling step can be attended to at the stage indicated in Figure 8, or the milk can be fed into the can and then the milk and can refrigerated in the refrigerator compartment as shown in Figures 2 and 3.

Reference being had at this stage to Figure 12 I direct attention to the fact that the closing lid 81 is provided with a suitable vent 81a which affords communication between the interior of the milk can and the surrounding atmosphere. I have shown this vent provided with a whistle 82 of any appropriate construction which serves to audibly notify the attendant when the can is nearly full of milk. The ball float 83 is provided with a stem 84 that is connected to the valve 85. When the can is nearly full of milk, the float 83 moves upwardly, raising valve 85 from its seat to thereby permit admission of air to the whistle 82.

The present application is a development of the subject-matter of my Patent No. 2,425,519, granted August 12, 1947, in which is disclosed another form of cooling the milk cans.

Changes in shape, size, and materials and rearrangement of details and parts may be resorted to in actual practice, so long as they do not depart from the spirit of the invention or the scope of the appended claims, as is well understood.

I claim:

1. A system for simultaneously milking a domestic farm animal and for cooling and storing the milk, without handling, in cans as it comes from the animal comprising a container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said receptacle interior and said second conduit means, and controllable mechanical refrigerating and cooling means operatively connected to said container for continuously cooling the milk and removing body heat therefrom during the milking operation and maintaining a predetermined temperature.

2. A system for simultaneously milking a domestic farm animal and for cooling and storing the milk, without handling, in cans as it comes from the animal comprising a container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said receptacle interior and said second conduit means, and controllable mechanical refrigerating and cooling means operatively connected to said container for continuously cooling the milk and removing body heat therefrom during the milking operation and maintaining a predetermined temperature, said refrigerating and cooling means including means for causing a substantially continuous flow of a cooling fluid medium against the outside surfaces of said can.

3. A system for simultaneously milking a domestic farm animal and for cooling and storing the milk, without handling, in cans as it comes from the animal comprising a container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said receptacle interior and said second conduit means, and controllable mechanical refrigerating and cooling means operatively connected to said container for continuously cooling the milk and removing body heat therefrom during the milking operation and maintaining a predetermined temperature, said refrigerating and cooling means including a coil for coolant and a fan for blowing air through said coil and against the exterior surfaces of said can while in said container.

4. A system for simultaneously milking a domestic farm animal and for cooling and storing the milk, without handling, in cans as it comes from the animal comprising a container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said can interior and said second conduit means, and controllable mechanical refrigerating and cooling means operatively connected to said container for continuously cooling the milk and removing body heat therefrom during the milking operation and maintaining a predetermined temperature, said container having a removable top provided with an aperture therein, and said can closure means extending through said top.

5. A system for simultaneously milking a domestic farm animal and for cooling and storing the milk, without handling, in cans as it comes from the animal comprising a container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said can interior and said second conduit means, and controllable mechanical refrigerating and cooling means operatively connected to said container for continuously cooling the milk and removing body heat therefrom during the milking operation and maintaining a predetermined temperature, said container having a removable top provided with an opening therein and said can closure means extending through said top and being in friction sealing contact therewith.

6. A system for simultaneously milking a domestic farm animal and for cooling and storing the milk, without handling, in cans as it comes from the animal comprising a container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said can interior and said second conduit means, and controllable mechanical refrigerating and cooling means operatively connected to said container for continuously cooling the milk and removing body heat therefrom during the milking operation and maintaining a predetermined temperature, means for attaching said refrigerating and cooling means to said container, said container having a side provided with an opening connecting the interior of said container with said refrigerating and cooling means, said latter means including a cooling coil and fan located adjacent said opening in said side whereby to circulate cooling air within the interior of said container and against the exterior surfaces of said can.

7. Apparatus for mechanically milking a cow and delivering the fresh warm milk into a shipping-type milk can for prompt cooling, storage and subsequent shipment comprising a milk refrigerator cabinet having a refrigerated can compartment, said compartment being provided with an opening, a receiving can in said compartment with its mouth accessible through said opening, a cover fitted through said opening and in fluid-tight contact with the mouth of said can, said cover embodying means coacting with the marginal edge portions of said opening and affording a substantially air-tight connection between said cover and cabinet, a milk pickup and feeding line connected at one end to said cover for discharging fresh warm milk, by way of said cover, into said milk can, a milking machine suction line also extending at one end through said cover for drawing milk through the feeding line and discharging the milk into said can.

8. Apparatus for mechanically milking a cow and delivering the fresh warm milk into a shipping-type milk can for prompt cooling, storage and subsequent shipment comprising a milk refrigerator cabinet having a refrigerated can compartment, said compartment being provided with an opening, a receiving can in said compartment with its mouth accessible through said opening, a cover fitted through said opening and in fluid-tight contact with the mouth of said can, said cover embodying means coacting with the marginal edge portions of said opening and affording a substantially air-tight connection between said cover and cabinet, a milk line and a suction line, said lines being in communication with the interior of said container, at least one of said lines passing through said cover.

9. A system for simultaneously milking a domestic farm animal and for cooling and storing the milk, without handling, in cans as it comes from the animal comprising a portable container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said cam interior and said second conduit means, and controllable mechanical refrigerating and cooling means operatively connected to said container for continuously cooling the milk and removing body heat therefrom during the milking operation and maintaining a predetermined temperature, and means for mounting said refrigerating and cooling means on said container.

10. A system for simultaneously milking a domestic farm animal and for cooling and storing the milk, without handling, in cans as it comes from the animal comprising a portable container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said can interior and said second conduit means, and controllable mechanical refrigerating and cooling means operatively connected to said container for continuously cooling the milk and removing body heat therefrom during the milking operation and maintaining a predetermined temperature, and means for mounting said refrigerating and cooling means on said container, said refrigerating and cooling means including means in communication with the interior of said container for causing a substantially continuous flow of a cooling fluid medium against the outside surfaces of said can.

11. A system for simultaneously milking a domestic farm animal and for cooling and storing the milk, without handling, in cans as it comes from the animal comprising a container for holding a milk can in an upright position, a milking machine including a first conduit means adapted for connection to a source of minus pressure, a second conduit means having teat cups for connection to the teats of the animal's udder, closure means closing the open end of said can and for permitting a minus pressure therein during the milking operation, means connecting both of said conduit means to said closure means and to the interior of said can, whereby minus pressure may be applied to said teat cups through said first conduit means, said can interior and said second conduit means, and controllable mechanical refrigerating and cooling means operatively connected to said container for continuously cooling the milk and removing body heat therefrom during the milking operation and maintaining a predetermined temperature, said container having at least one opening and said closure means extending through said opening and in engagement therewith.

GEORGE R. DUNCAN.

REFERENCES CITED

The following references are of record in the file of this patent:

UNITED STATES PATENTS

| Number | Name | Date |
|---|---|---|
| 1,048,597 | Shephard | Dec. 31, 1912 |
| 1,536,634 | Shippert et al. | May 5, 1925 |
| 1,596,520 | Eskholme et al. | Aug. 17, 1926 |
| 1,825,645 | Martin, Jr. | Sept. 29, 1931 |
| 1,861,898 | Raven-Rosen-Baum et al. | June 7, 1932 |
| 1,913,345 | Smith | June 6, 1933 |
| 1,980,945 | Smith | Nov. 13, 1934 |
| 2,006,393 | Hapgood | July 2, 1935 |
| 2,285,520 | Keyser | June 9, 1942 |
| 2,293,041 | Borden | Aug. 18, 1942 |
| 2,350,602 | Frost | June 6, 1944 |
| 2,357,373 | Anderson | Sept. 5, 1944 |
| 2,366,273 | Lowry | Jan. 2, 1945 |
| 2,407,159 | Jones | Sept. 3, 1946 |